US00RE42086E

(19) United States
(12) Reissued Patent
Saito et al.

(10) Patent Number: US RE42,086 E
(45) Date of Reissued Patent: Feb. 1, 2011

(54) UTILITY VEHICLE WITH CABIN FRAME

(75) Inventors: Hideo Saito, Akashi (JP); Kazumasa Hisada, Akashi (JP); Aaron Bahner, Eden Prairie, MN (US)

(73) Assignee: Kawasaki Jukogyo Kabushiki Kaisha, Kobe-shi (JP)

(21) Appl. No.: 12/512,804

(22) Filed: Jul. 30, 2009

Related U.S. Patent Documents

Reissue of:
(64) Patent No.: 7,249,798
Issued: Jul. 31, 2007
Appl. No.: 10/949,461
Filed: Sep. 24, 2004

U.S. Applications:

(63) Continuation-in-part of application No. 10/785,201, filed on Feb. 23, 2004, now Pat. No. 6,994,388.

(51) Int. Cl.
*B62D 25/06* (2006.01)

(52) U.S. Cl. ..... 296/205; 296/29; 296/210; 280/756

(58) Field of Classification Search ..... 296/205, 296/102, 104, 203.03, 29, 210, 183.2, 26.08, 296/26.09, 26.1, 26.11, 37.6, 37.16, 65.05, 296/65.09; 280/756, DIG. 5; 298/17 R; 297/325
See application file for complete search history.

(56) References Cited

U.S. PATENT DOCUMENTS

| | | | | |
|---|---|---|---|---|
| 3,169,792 | A | | 2/1965 | Viquez |
| 4,480,868 | A | | 11/1984 | Koto |
| 6,260,916 | B1 | | 7/2001 | Hunt |
| 6,286,888 | B1 | | 9/2001 | Essig |
| 6,398,291 | B1 | | 6/2002 | Reusswig et al. |
| 6,450,566 | B1 | | 9/2002 | Hong |
| 6,478,355 | B1 | | 11/2002 | Van Eden et al. |
| 6,481,772 | B1 | | 11/2002 | Tenn |
| 6,517,111 | B2 | | 2/2003 | Mizuta |
| 6,517,135 | B2 | | 2/2003 | de Gaillard |
| 6,550,849 | B1 | | 4/2003 | Dosdall |
| 6,623,067 | B2 | | 9/2003 | Gabbianelli et al. |
| D483,695 | S | * | 12/2003 | Bellington ..... D12/16 |
| 6,786,535 | B1 | | 9/2004 | Grzegorzewski |
| 6,923,507 | B1 | * | 8/2005 | Billberg et al. ..... 298/17 R |
| 7,249,798 | B2 | | 7/2007 | Saito et al. |
| 2005/0001446 | A1 | | 1/2005 | Morley |

FOREIGN PATENT DOCUMENTS

| | | | |
|---|---|---|---|
| JP | 07-144589 | | 6/1995 |
| JP | 1995-236825 | * | 7/1995 |

OTHER PUBLICATIONS

USPTO Office Action of U.S. Appl. No. 10/785,201, filed May 11, 2005, 7 pages.
USPTO Office Action of U.S. Appl. No. 10/949,461, filed Oct. 12, 2006, 19 pages.

* cited by examiner

*Primary Examiner*—Joseph D Pape
(74) *Attorney, Agent, or Firm*—Alleman Hall McCoy Russell & Tuttle LLP

(57) ABSTRACT

A utility vehicle having a cabin-frame assembly coupled to the vehicle body so as to cover rows of seats is provided. Typically, the assembly includes a main frame extended in the longitudinal direction of the vehicle substantially arcuately over the rows of seats, and an intermediate frame extended substantially arcuately and laterally across the vehicle body between the seat rows to support the main frame.

58 Claims, 12 Drawing Sheets

UTILITY VEHICLE WITH CABIN FRAME

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of U.S. patent application Ser. No. 10/785,201, filed Feb. 23, 2004, now U.S. Pat. No. 6,994,388 entitled PICK-UP STYLE UTILITY VEHICLE WITH ADJUSTABLE CARGO BED, the entire disclosure of which is herein incorporated by reference for all purposes.

TECHNICAL FIELD

The present invention generally relates to a pick-up style utility vehicle with a cabin-frame coupled to the vehicle body so as to cover seats to define a cabin space of the vehicle.

BACKGROUND OF THE INVENTION

Pick-up style utility vehicles are typically characterized by a cargo bed located behind one or more rows of seats, each row having one or more seats. Each seat typically has a leg area positioned immediately in front of the seats, such that a person may ride in a sitting position. A steering wheel is typically positioned above the leg area of one of the seats. Pick-up style utility vehicles may be contrasted with other utility vehicles such as all-terrain vehicles (ATVs), which have a seat that is straddled by a rider and a handle bar for steering. Pick-up style utility vehicles are used for a wide variety of off-road utility applications, such as moving materials including lumber, farm and ranch tasks, golf course maintenance, hunting, etc.

Prior pick-up style utility vehicles with two rows of seats generally suffer from the drawback that less cargo may be accommodated, since the cargo bed must typically be shortened to allow room for an additional row of seats. Prior pick-up style utility vehicles with only one row of seats are typically equipped with larger cargo beds, but cannot accommodate a larger number of passengers. Thus, users that occasionally carry a large number of passengers, and occasionally carry large loads find that they cannot accomplish both tasks well with the same vehicle.

BRIEF SUMMARY OF THE INVENTION

A utility vehicle having a plurality of rows of seats and a cabin-frame assembly coupled to the vehicle body so as to cover the rows of seats to define a cabin space of the vehicle is provided. According to one aspect of the invention, the cabin-frame assembly includes a main frame extended in the longitudinal direction of the vehicle substantially arcuately over the rows of seats, wherein a front end of the main frame is coupled to a front portion of the vehicle body and a rear end of the main frame is coupled to a rear portion of the vehicle body. The cabin-frame assembly further typically includes an intermediate frame extended substantially arcuately and laterally across the vehicle body between the seat rows. Respective ends of the intermediate frame are coupled to opposite sides of the vehicle body, and the intermediate frame is coupled to and configured to support the main frame.

The main frame may be detachably coupled to the front portion and the rear portion of the vehicle body.

The intermediate frame may be detachably coupled to the vehicle body.

The main frame may include a joint formed at an intersection of the main frame and the intermediate frame, the main frame being configured to be divisible at the joint.

A foremost part of the main frame may include a front frame structure formed in an inverse U-shape extending laterally across the vehicle body; and a front roof structure extending rearward from a top portion of the front frame structure, wherein a rear end of the front roof structure is configured to connect with the intermediate frame.

The front roof structure may include a pair of bar-shaped members arranged in the longitudinal direction of the vehicle, substantially in parallel with each other.

The front roof structure may be welded to the front frame to form an integral unit.

Respective ends of the front frame structure may be configured to be detachably coupled to opposite sides of the vehicle body in front of a foremost seat row.

A rearmost part of the main frame may include a rear frame structure formed in an inverse U-shape extending laterally across the vehicle body.

The utility vehicle may further comprise an air cleaner and a CVT cooling system, and the rear frame structure may include an air intake, an air outlet connected to at least one of the air cleaner and the CVT cooling system of the vehicle, and an air passage formed inside the rear frame so as to communicate with the air intake and the air outlet.

The rearmost part of the main frame may further include a rear roof structure extending forward from a top portion of the rear frame structure, wherein a front end of the rear roof structure is configured to connect with the intermediate frame.

The utility vehicle may further include a cargo bed disposed behind a rearmost seat row, the cargo bed being configured to tilt, and wherein the top portion of the rear frame structure is bent forward to form a portion of the rear roof structure, and the bent portion is configured not to interfere with the cargo bed when the cargo bed tilts.

The rear roof structure may include a pair of bar-shaped members arranged in the longitudinal direction of the vehicle, substantially in parallel with each other.

The rear roof structure may be configured to be detachably coupled to the top portion of the rear frame structure.

Respective ends of the rear frame structure may be configured to be detachably coupled to opposite sides of the vehicle body adjacent corresponding sides of a rearmost seat row, and respective pillar portions of the rear frame structure may pass through the corresponding sides of the rearmost seat row and incline rearward.

The intermediate frame may be formed in an inverse U-shape.

The intermediate frame may include a cross member extending laterally between pillar portions of the intermediate frame, and detachably coupled to the pillar portions of the intermediate frame.

The cross member may support a backrest portion of a seat row in front of the cross frame.

At least a portion of the cross member may be configured to be a supporting grip graspable by a passenger seated in a seat row behind the cross frame.

The intermediate frame may include a pair of side guides being coupled to and extending forward from respective locations on opposite sides of the intermediate frame.

According to another aspect of the invention, a cabin-frame assembly for a utility vehicle with a plurality of rows of seats is provided. The cabin-frame assembly may be coupled to the vehicle body so as to cover the rows of seats to define a cabin space of the vehicle. The cabin-frame assembly typically includes a main frame extended in the longitudinal direction of the vehicle substantially arcuately over the rows of seats. A front end of the main frame is coupled to a front portion of the vehicle body, a rear end of the main frame is coupled to a rear portion of the vehicle body, and an intermediate frame extends substantially arcuately and laterally across the vehicle body between the seat rows. Respective ends of the intermediate frame are attached to opposite sides of the vehicle body, and the intermediate frame is configured to support the main frame.

The above and further objects and features of the invention will more fully be apparent from the following detailed description with accompanying drawings.

DETAILED DESCRIPTION OF THE INVENTION

The present invention will now be described in detail referring to the accompanying drawings illustrating the embodiments thereof.

Figure 1:
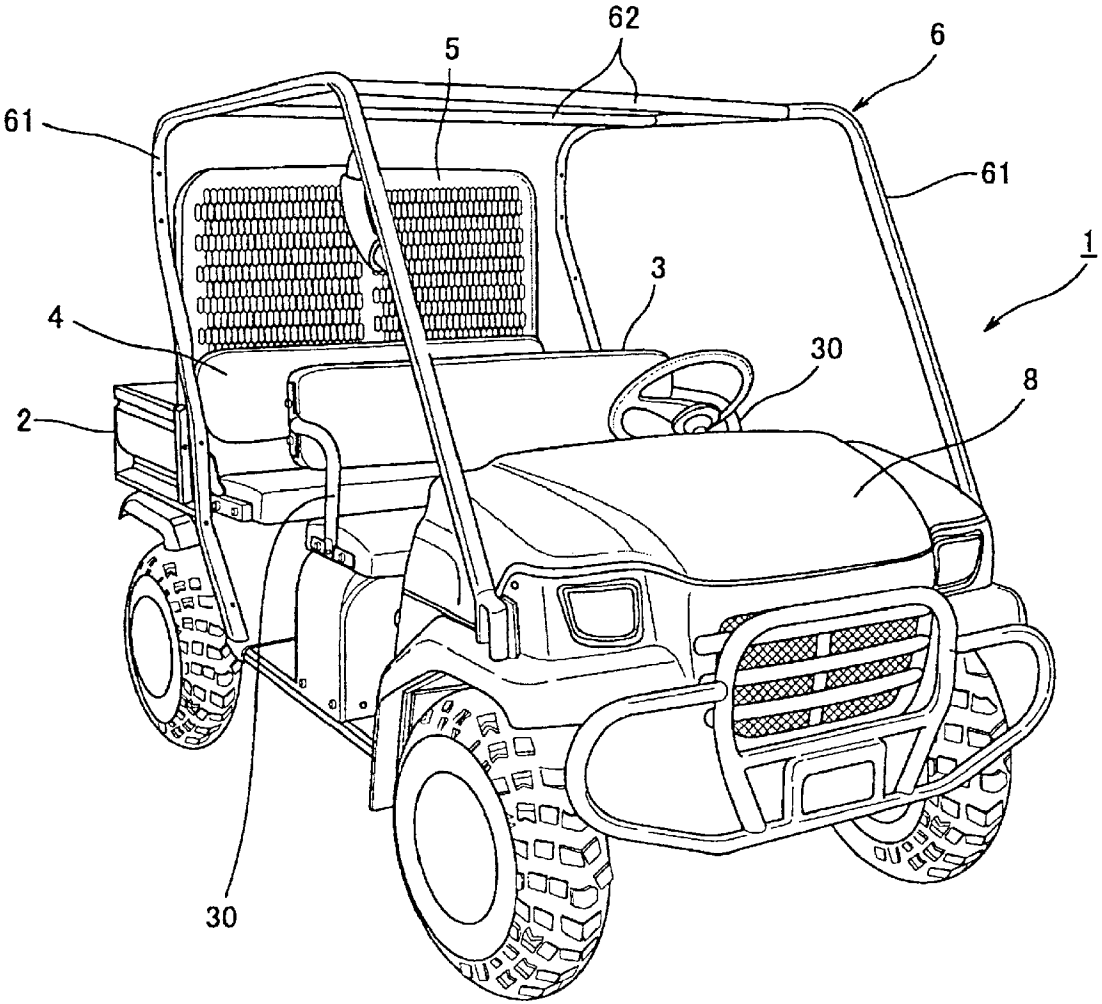
FIG. 1 is a perspective view of a pick-up style utility vehicle with an adjustable cargo bed according to one embodiment of the present invention.

FIG. 1 is a perspective view of a pick-up style utility vehicle 1 according to one embodiment of the present invention. The vehicle typically has a body coupled to four rotatable wheels, and one or more rows of seats, each row having one or more places for a person to sit. Vehicle 1 typically includes a front seat 3, which is typically a bench seat configured to accommodate up to two persons, one side of which is used as a driver's seat and the other side of which may be used as a passenger's seat. Vehicle 1 typically further includes a rear seat 4, which is also typically a bench seat configured to accommodate two passengers. Thus vehicle 1 typically may accommodate up to four persons in total. Of course, the above embodiment is merely illustrative, and it will be appreciated that various other seat configurations may be provided. For example, each of the front and rear rows of seats may include pairs of individual seats, rather than bench seats, or each of the rows of seats may only be designed to accommodate one passenger. Behind the rear seat 4, there is provided a cargo bed 2. Cargo bed 2 is typically rectangular in shape, and includes a surrounding panel assembly formed around its perimeter, the surrounding panel assembly including a front panel and side panels. Alternatively, the cargo bed may be of another suitable polygonal or curved shape for holding cargo. A divider 5 is attached to the foremost end of the cargo bed 2 to separate the rear seat 4 from the cargo bed 2. Typically, the divider is a meshed screen shield 5. Alternatively, the divider may be a non-meshed panel or other suitable dividing structure.

A cabin frame 6 is provided over the seats, and defines a cabin space for the driver and passengers. The cabin frame 6 includes a pair of side bars 61 provided on the right and left sides of the vehicle body to define side face of the vehicle 1. Typically the side bars arc from the front to the rear of the vehicle to define a passageway through which passengers may enter and exit seats 3, 4. A front portion of each side bar typically attaches to the vehicle body at a respective mounting location adjacent a right or left side of a hood 8 of the vehicle, and extends rearwardly and upwardly to a roof. The roof is typically substantially flat, and defined by a middle portion of each of the side bars and a plurality of transverse bars 62 stretching between the side bars. The roof is typically formed to provide sufficient head room for any passengers seated in seats 3, 4. A rear portion of each of the side bars extends downward from the roof and attaches to the vehicle body adjacent the rear seats 4. Arm bars 30 may also be provided adjacent a right and left side of seat 3, and typically mount the seat back to the seat base of seat 3. Alternatively, the cabin may be formed in another shape suitable to hold passengers.

Figure 2A:
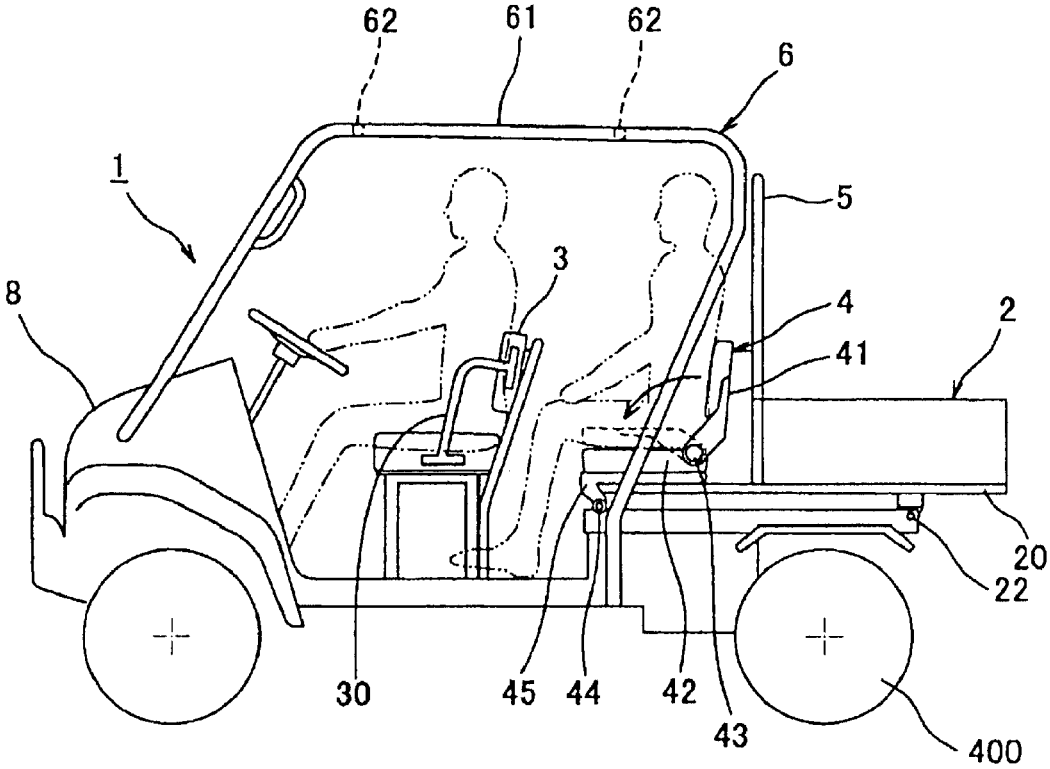
FIG. 2A is a schematic left side view of the utility vehicle of FIG. 1 with the vehicle's rear seat occupied by passenger (s)
Figure 2B:
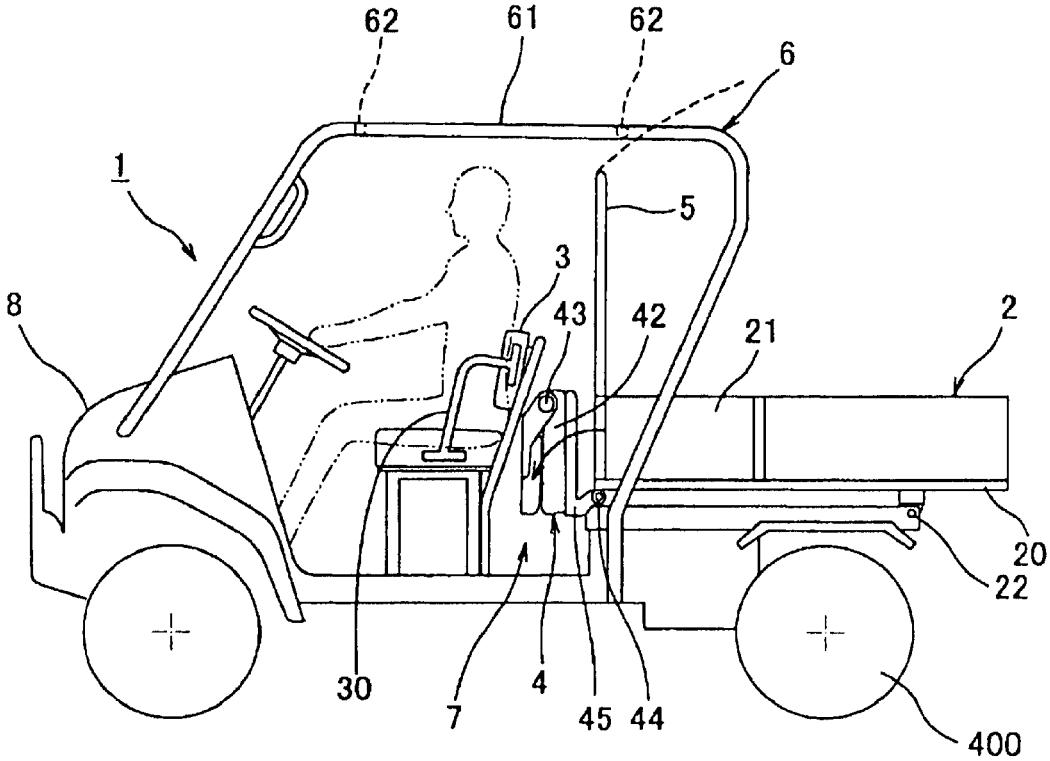
FIG. 2B is a view of the utility vehicle of FIG. 2A, showing the rear seat retracted and the cargo bed extended.

As shown in broken lines in FIGS. 2A and 2B, rear seat 4 is coupled to the body of the vehicle in a manner that enables the rear seat to be movable between a stowed configuration, shown in FIG. 2B, and a deployed configuration shown in FIG. 2A. The rear seat 4 typically includes a bottom portion 42 upon which one or more passengers may sit, and a backrest portion 41 configured support each passenger's back. The bottom portion 42 is typically supported in the deployed configuration by the bottom plate 20 of the cargo bed. A lower end of the back portion 41 is typically pivotably mounted by a pivot 43 to a rear end of bottom portion 42, such that the back portion may be folded forward by a user to lie in a substantially flat intermediate position, shown in dashed lines in FIG. 2A. Further, a front end of the bottom portion 42 is hinged to the vehicle body so as to be rotatable around a pivot 44. Typically, the bottom portion 42 is connected to the pivot 44 through an arm 45 extending downwardly from the front end of the bottom portion 42, so that a bottom surface of the bottom portion 42 is moved to a location forward of the pivot 44 when retracted. Thus, the seat can be moved from the intermediate position to a stowed configuration, shown in FIG. 2B, in which the entire rear seat 4 is retracted into a leg space 7 of the vehicle. The leg space is typically defined as the space in front of and/or below the rear seat 4 in the deployed configuration, where a passenger might rest his or her legs while riding in the vehicle.

In this embodiment, cargo bed 2 is configured to be extendable forward into a space at least partially occupied by the rear seat 4 when the rear seat was in the deployed configuration, as described in more detail hereinafter. The screen shield 5 may be manually removed from the cargo bed 2 and reattached to a foremost end of an extendable portion 21 of the cargo bed 2, to enable the screen shield 5 to be repositioned from a position adjacent the forward end of the cargo bed in the retracted configuration to a position adjacent the forward end of the cargo bed in the extended configuration.

Thus, a user who desires to carry a large load rather than passengers in the rear seat 4, may move the rear seat from the deployed to the stowed configuration, thereby freeing space formerly occupied by the rear seat in the deployed configuration. This may be accomplished by folding down the back portion 41 to the intermediate position, and pivoting the bottom portion 42 with the folded backrest portion 41 into the stowed configuration in leg space 7. Once the seat is in the stowed configuration, the user may remove the screen shield 5 from the cargo bed 2, and extend an extendable portion of the cargo bed from a retracted configuration to an extended configuration, into the space freed by moving the seat. The user typically may accomplish this by extending the sides of the cargo bed, by pivoting or sliding, as discussed below. Once the cargo bed is in the extended configuration, the user may reattach the screen shield 5 adjacent a forward end of the cargo bed 2 in the extended configuration, thereby providing extended cargo space for the large load.

Figure 3A:
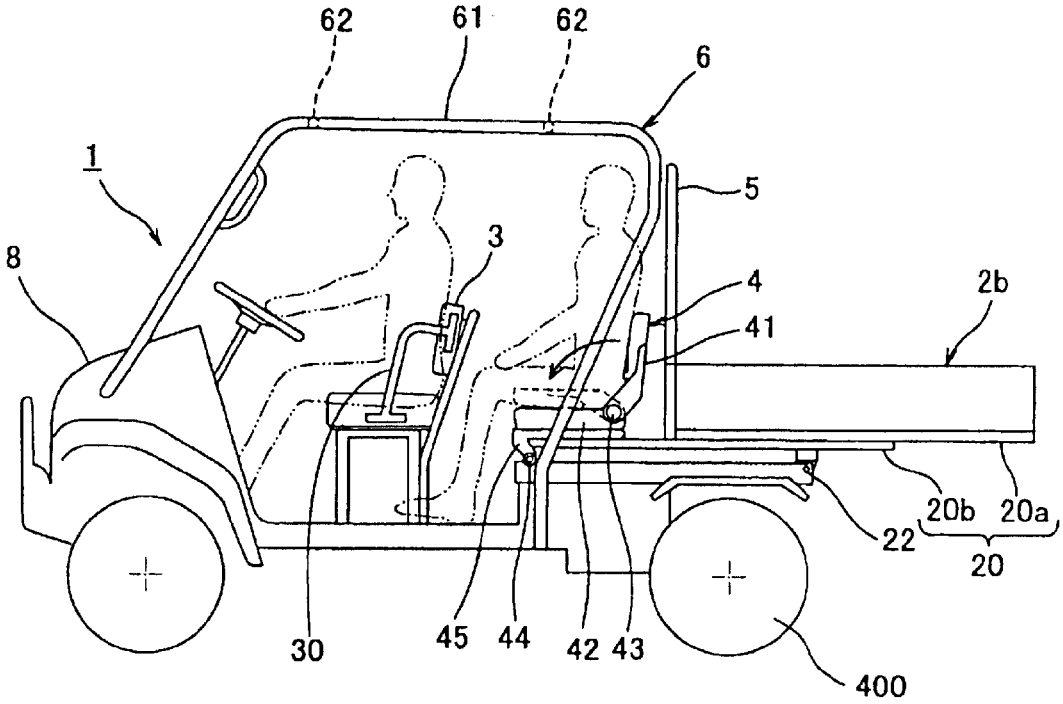
FIG. 3A is a schematic left side view of the utility vehicle of another embodiment according to the present invention with the vehicle's rear seat occupied by passenger(s)
Figure 3B:
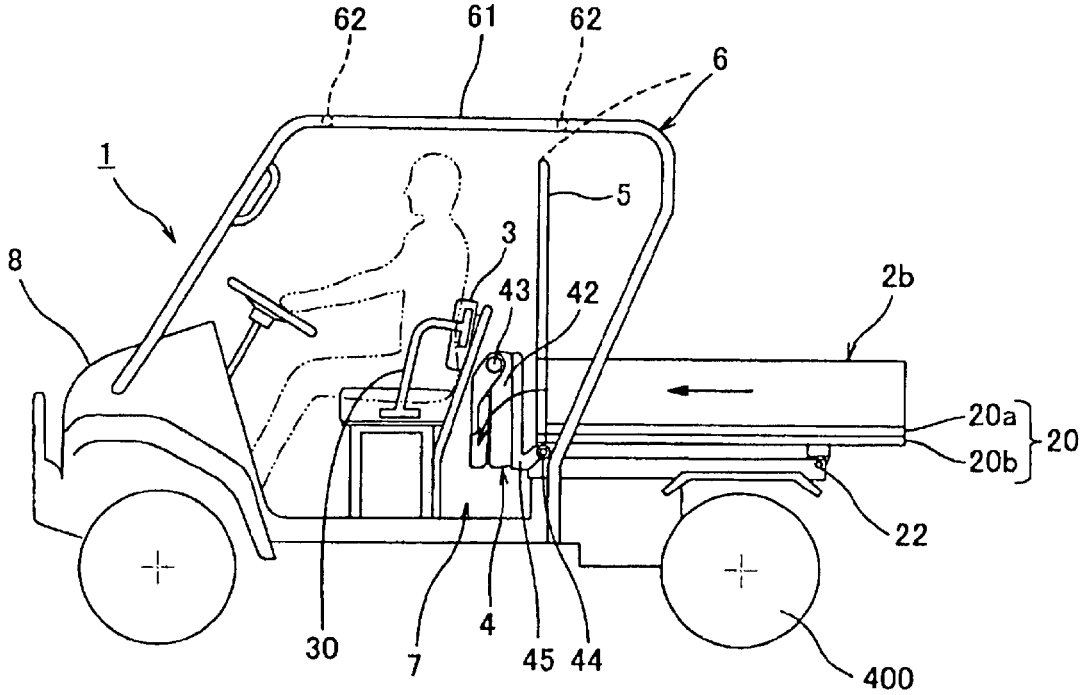
FIG. 3B is a view of the utility vehicle of FIG. 3A, showing the rear seat retracted and the cargo bed moved forward.

According to another embodiment of the present invention, shown in FIGS. 3A and 3B, utility vehicle 1 may include a relatively large cargo bed 2b which is slidably attached to the vehicle body, such that the cargo bed may be moved between a second configuration, also referred to as an overhang configuration, shown in FIG. 3A, in which a rear end of the cargo bed overhangs the rear wheels of the vehicle to a greater extent, and a first configuration, also referred to as a compact configuration, shown in FIG. 3B, in which the rear end of the cargo bed overhangs the rear wheels of the vehicle to a lesser extent than the first configuration, and in which the forward end of the cargo bed is position in a space formerly occupied by the rear seat in the deployed configuration. The bottom plate 20 of the cargo bed 2b typically includes an upper bottom plate 20a and a lower bottom plate 20b, which are slidable relative to each other along a longitudinal direction of the vehicle, to thereby enable the cargo bed to move between the first and second configurations.

A portion of the lower bottom plate 20b is positioned beneath the bottom portion 42 of the rear seat 4 to stably hold the bottom portion 42 thereon when the entire rear seat 4 is not retracted. Typically, this embodiment is manufactured using substantially the same chassis as the embodiment shown in FIGS. 2A and 2B, and only the structure of the cargo bed differs between the embodiments.

With this configuration, even when the rear seat 4 is occupied by one or more passengers, the cargo bed 2b can carry a large load. However, in this embodiment, since an upper part of the cargo bed 2b, excluding lower bottom plate 20b, protrudes to the rear of vehicle 1 well over a pivot 22 around which the entire cargo bed 2b can be tilted for unloading when unlocked, a load in a rear portion of the cargo bed 2b creates a moment around the pivot 22. Therefore, as shown in FIG. 3B, the upper part of the cargo bed 2b is formed to be manually slid forward with respect to the lower bottom plate 20b until a front portion of the upper part of the cargo bed 2b reaches a location formerly occupied by the stowed rear seat 4. In this embodiment, while cargo bed 2b is not typically configured to be adjustable in size, a relatively large cargo bed may be provided, which may be moved into an overhang configuration to accommodate passengers, or into a compact configuration when the rear seat is stowed.

Figure 4A:
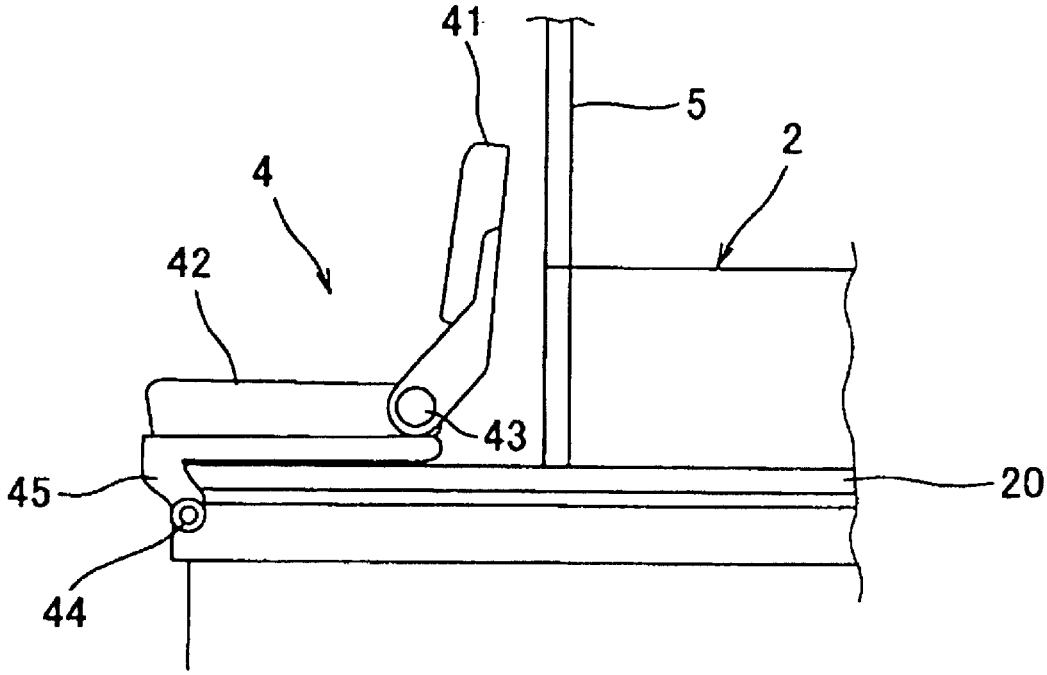
FIG. 4A is a partial schematic view of the utility vehicle in the configuration shown in FIG. 2A, showing the rear seat in the deployed configuration.
Figure 4B:
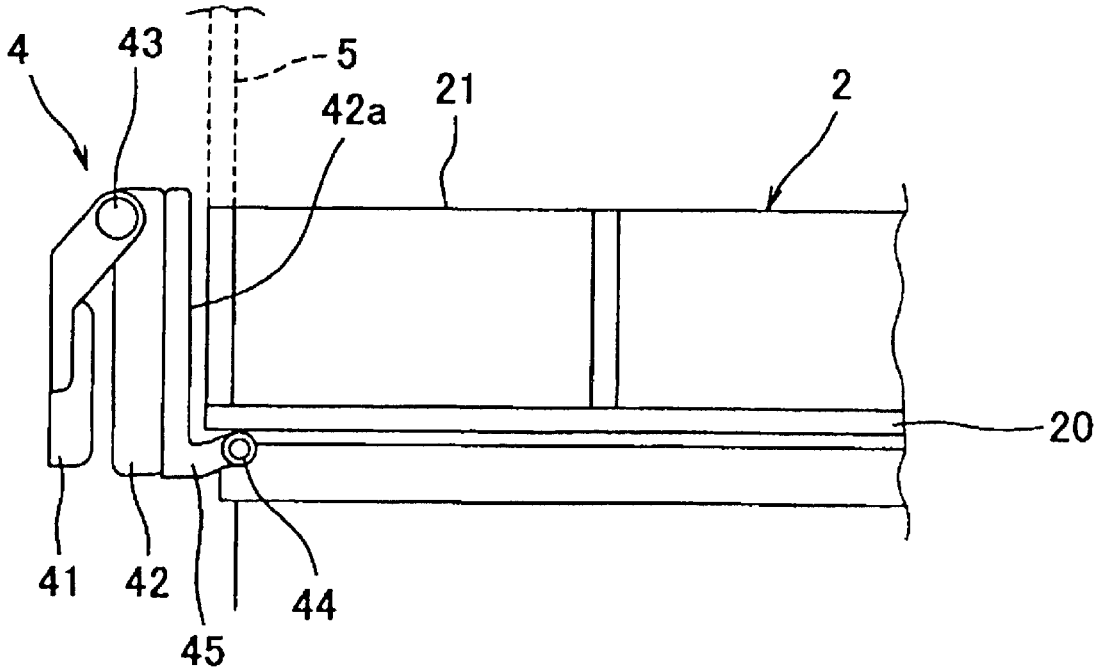
FIG. 4B is a partial schematic view of the utility vehicle in the configuration shown in FIG. 2B, showing the rear seat in the stowed configuration, in which a bottom of the rear seat is positioned adjacent a front panel of the cargo bed.

Returning to the embodiment discussed with respect to FIGS. 2A and 2B, it will be appreciated that the rear seat 4 may be utilized as a front panel for the cargo bed 2. As shown in detail in FIG. 4A, the rear seat 4 may be pivotably mounted to the vehicle's body. As shown in FIG. 4B, the rear seat 4 may be manually retracted to a stowed configuration such that a bottom surface of the bottom portion 42 of the rear seat 4 covers a front opening of the cargo bed 2, and the rear seat 4 is locked to the position by an appropriate locking mechanism (not shown). In this example, the rear seat 4 serves as the front panel of the cargo bed 2 and, thus, typically no screen shield 5 is installed. However, the screen shield 5 may be attached to the extendable portion 21 of the cargo bed 2, if desired.

Figure 5A:
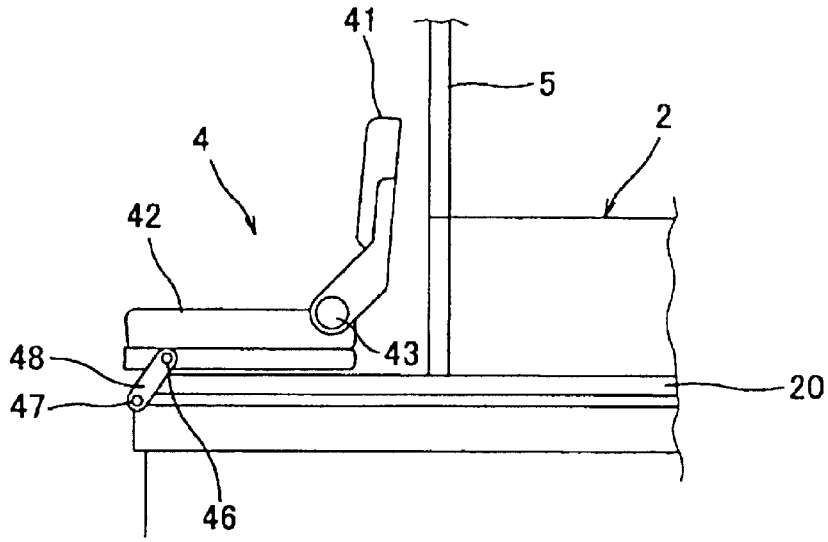
FIG. 5A is a partial schematic view of the utility vehicle shown in the configuration shown in FIG. 2A, showing the rear seat in a deployed configuration.
Figure 5B:
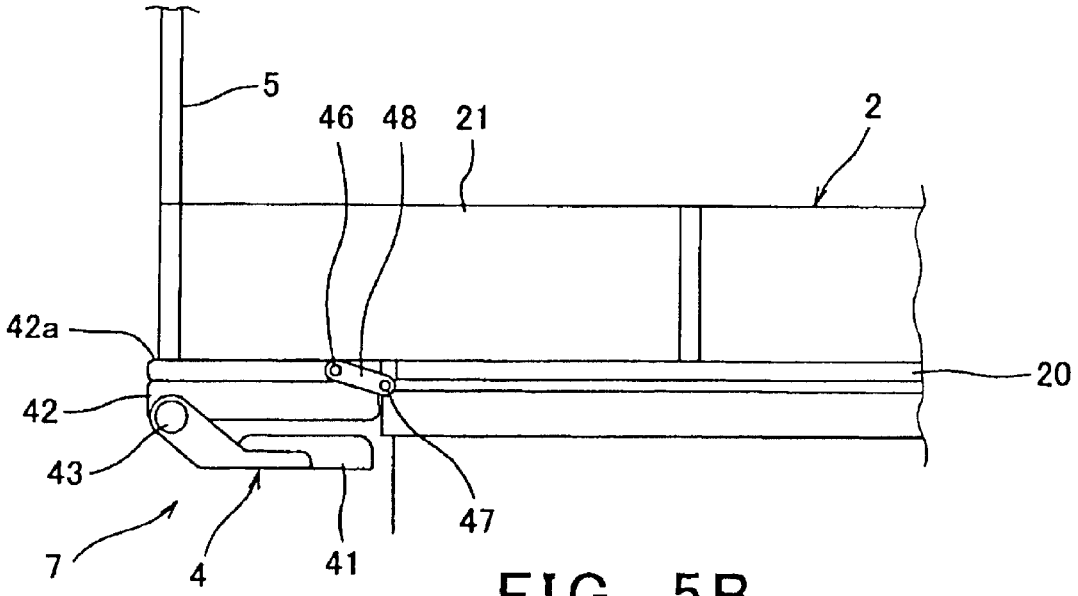
FIG. 5B is a partial schematic view of the utility vehicle in the configuration shown in FIG. 2B, showing the rear seat in a stowed configuration, in which a bottom of the rear seat is positioned adjacent a bottom plate of the cargo bed.

According to another embodiment of the present invention, shown in FIGS. 5A and 5B, rear seat 4 is configured to be movable to a stowed position in which a bottom surface 42a is substantially parallel and positioned upside down in front of bottom plate 20, such that a portion of the cargo bed 2 (such as extendable portions 21) may rest upon the bottom surface of the seat. As shown in FIG. 5A, the rear seat 4 is hinged to the vehicle body utilizing a hinge 48 having two pivots 46, 47. As shown in FIG. 5B, the entire rear seat 4 can be manually retracted to an upside-down configuration into leg space 7, and the rear seat 4 may be locked to the position by an appropriate locking mechanism (not shown). Therefore, the entire bottom portion 42 is moved in front of the pivot 47 when in the retracted configuration, so that the bottom surface of the bottom portion 42 and the foremost part of the bottom plate 20 of the cargo bed 2 form a substantially continuous plane.

Figure 6:
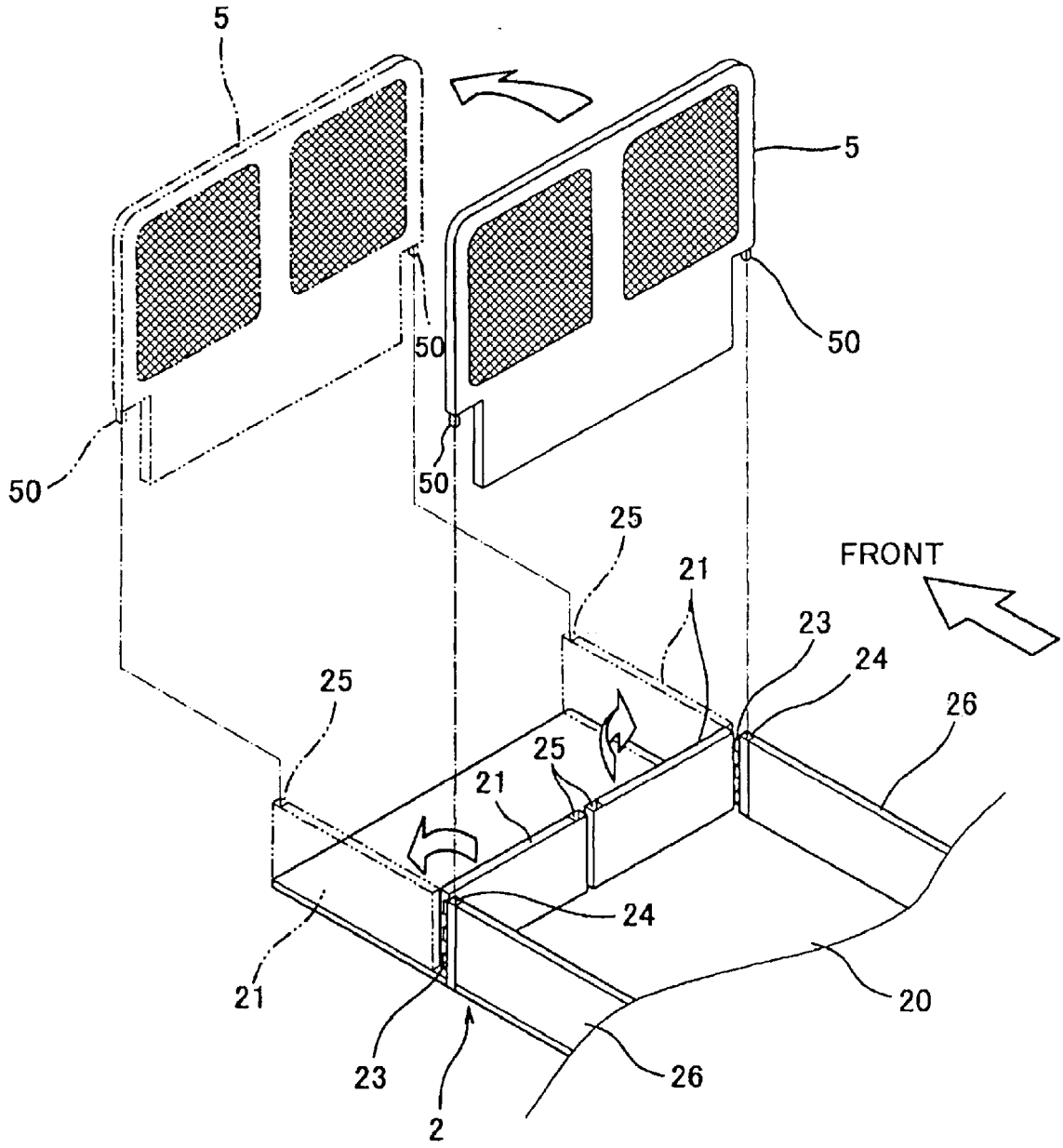
FIG. 6 is a perspective view of the cargo bed of FIGS. 2A and 2B, showing extendable portions of the cargo bed according to one embodiment of the present invention, the extendable portions being configured to rotatably-extend from a retracted configuration in which the portions border a front panel of the cargo bed, to an extended configuration in which the extendable portions form side panels of the cargo bed.
Figure 7:
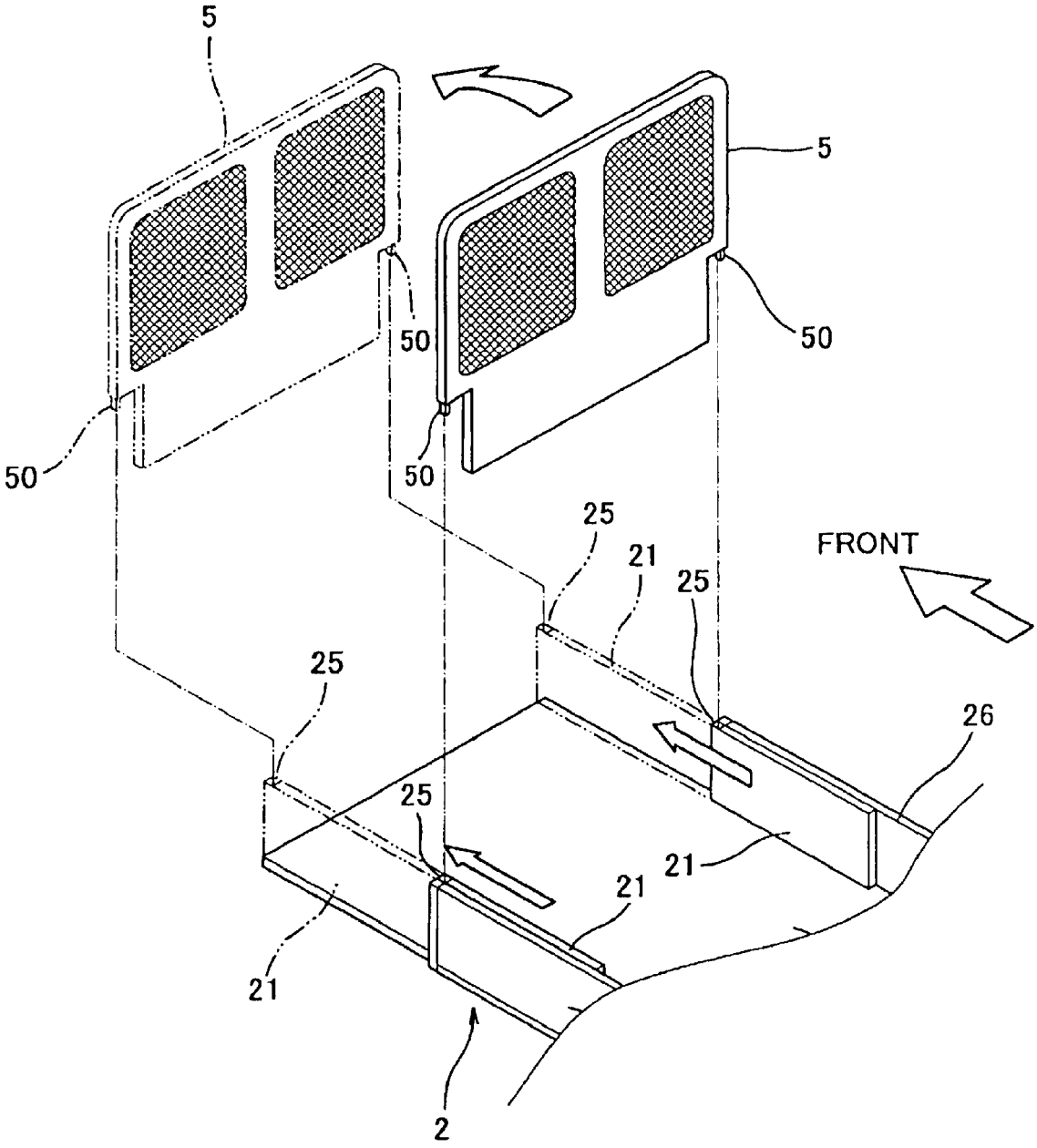
FIG. 7 is a perspective view of a cargo bed of FIGS. 2A and 2B, extendable portions of the cargo bed according to another embodiment of the present invention, in which the extendable portions are configured to slide from a retracted position to an extended position along the sides of the cargo bed.

The extension of the cargo bed 2 may be achieved as shown in FIGS. 6 and 7. FIG. 6 shows extendable portions 21 serving as a front panel of cargo bed 2 when extendable portions 21 in a retracted configuration. Each of the extendable portions 21 is hinged at a proximate end by hinges 23 to a front end of a respective side panel 26. Each of the extendable portions typically has a length of approximately a half of the width of the cargo bed 2. The extendable portions 21 may be moved from the retracted configuration in which they serve as the front panel, as illustrated with solid lines in FIG. 6, by pivoting the extendable portions around the hinges 23 approximately 90 degrees to an extended configuration illustrated with two-dot-chain lines in FIG. 6.

As also shown in FIG. 6, an opening 24 (typically square) is formed so as to be opened upwardly at the front end of each of the side panels 26. The screen shield 5 is typically substantially a rectangular shape and its upper part has a width corresponding to the distance between outer surfaces of the side panels 26. The lower part of the screen shield 5 is narrowed to correspond the distance between inner surfaces of the side panels 26. Typically, the upper part of the screen shield 5 is meshed and the meshed portion is divided in two at the middle thereof, to leave a solid rib therebetween to add strength to the screen shield 5. Bosses 50 are provided to the upper end of the narrowed section of the screen shield 5 so as to protrude downwardly. The screen shield 5 is attached to the front ends of the side panels 26 so that the bosses 50 are inserted into the openings 24 formed in the side panels 26 when the extendable portions 21 are retracted to be the front panel of the cargo bed 2. The extendable portions 21 also have upwardly-opened openings 25 of the same shape and size as the openings 24 of the side panels 26, at opposing ends.

Accordingly, when user wants to extend the cargo space, the user pulls out the screen shield 5 from the openings 24 of the side panels 26. Then, the user rotates each of the extendable portions 21 from the solid-lined retracted position to the two-dot-chain-lined extended position, each rotating approximately 90 degrees. The user then reattaches the screen shield 5 to the openings 25 of the extendable portions 21. Here, the narrowed lower section of the screen shield 5 is configured to reach down to the upper surface of the bottom plate 20 so that it also serves as the front panel of the cargo bed 2 when the extendable portions 21 are extended.

The extension of the cargo bed 2 may also be achieved as shown in FIG. 7. In this example, the extendable portions 21 are provided so as to slide relative to the cargo bed 2 in a longitudinal direction of the vehicle. The extendable portions 21 may be provided to the bottom plate 20 or the side panels 26 through an appropriate sliding means such as a combination of rollers and rails. In this example, the extendable portions 21 typically do not serve as the front panel of the cargo bed 2 since they are forwardly extendable to an extended configuration (as shown with two-dot-chain lines in FIG. 7) from a retracted configuration (as shown with solid lines in FIG. 7). Instead, in this example, the narrowed lower section of the screen shield 5 serves as the front panel of the cargo bed 2 when the extendable portions 21 are extended as described above. To achieve this, the extendable portions 21 have upwardly-opened openings 25 at foremost ends to accommodate the bosses 50 of the screen shield 5. In this example, the screen shield 5 may be fixed to the extendable portions 21 and moved with the extendable portions 21, since a distance between the openings 25 does not change during the slide movement of the extendable portions 21.

In the above embodiments, it has been described that the back portion of the bench-type rear seat is foldable to provide the space for the cargo bed, however, it will be appreciated by those skilled in the art that only a section thereof may be foldable and moveable between the deployed and retracted positions, or the rear seat may have a plurality of independently stowable and deployable sections. In addition, while a two-seat type vehicle has been illustrated, it will be appreciated that the present invention is also applicable to utility vehicles with only one seat, in which the seat's backrest portion on a passenger's side is independently foldable relative to the driver's side. Further, while bench seats have been illustrated, it will be appreciated that the present invention is applicable to utility vehicles of a non-bench-seat type in which the passenger's seat is foldable and the entire passenger's seat is independently formed from the driver's seat. Further, as described above, it will also be appreciated by those skilled in the art that the present invention is also applicable to utility vehicles with three or more rows of seats.

According to another embodiment of the present invention, shown in FIGS. 8 through 11, the utility vehicle 1 includes a cabin frame (assembly) 6B which shape is similar to but which configuration differs from those in the above embodiments. Other components are similar to the components in the above embodiments and, similar components are numbered with like reference numerals, and will not be redescribed for the sake of brevity.

The cabin frame assembly 6B includes a main frame 60 extended in the longitudinal direction of the vehicle substantially arcuately over the rows of seats 3B and 4. A front end of the main frame 60 is coupled to a front portion of the vehicle body, typically at frame portions 81 exposed on opposite sides of the hood 8. A rear end of the main frame 60 is coupled to a rear portion of the vehicle body, typically at opposed side frames 82 that extend in the longitudinal direction, on which a floor plate or foot step is located.

An intermediate frame 68 extends substantially arcuately and laterally across the vehicle body between the seat rows 3B and 4. In this embodiment, there is provided a single intermediate frame 68 between the front seat 3B and the rear seat 4; however, if the vehicle is configured to have more than two rows of seats, vehicle 1 may be provided with additional intermediate frame in between the additional rows of seats. Respective ends of the intermediate frame 68 are coupled to opposite sides of the vehicle body at a location such as the opposite side frames 82, which extend in the longitudinal direction and parallel with each other, and on which the floor plate or foot step is located. The intermediate frame 68 is coupled to and configured to support the main frame 60 at a top portion thereof.

In this embodiment, the main frame 60 is detachably coupled to the front portion and rear portion of the vehicle body. In this embodiment, the intermediate frame 68 is also detachably coupled to the vehicle body.

In this embodiment, the main frame 60 is constructed from two parts, a foremost part 65 and a rearmost part (a combination of 66 and 67), divided by the intermediate frame 68 therebetween.

Figure 12:
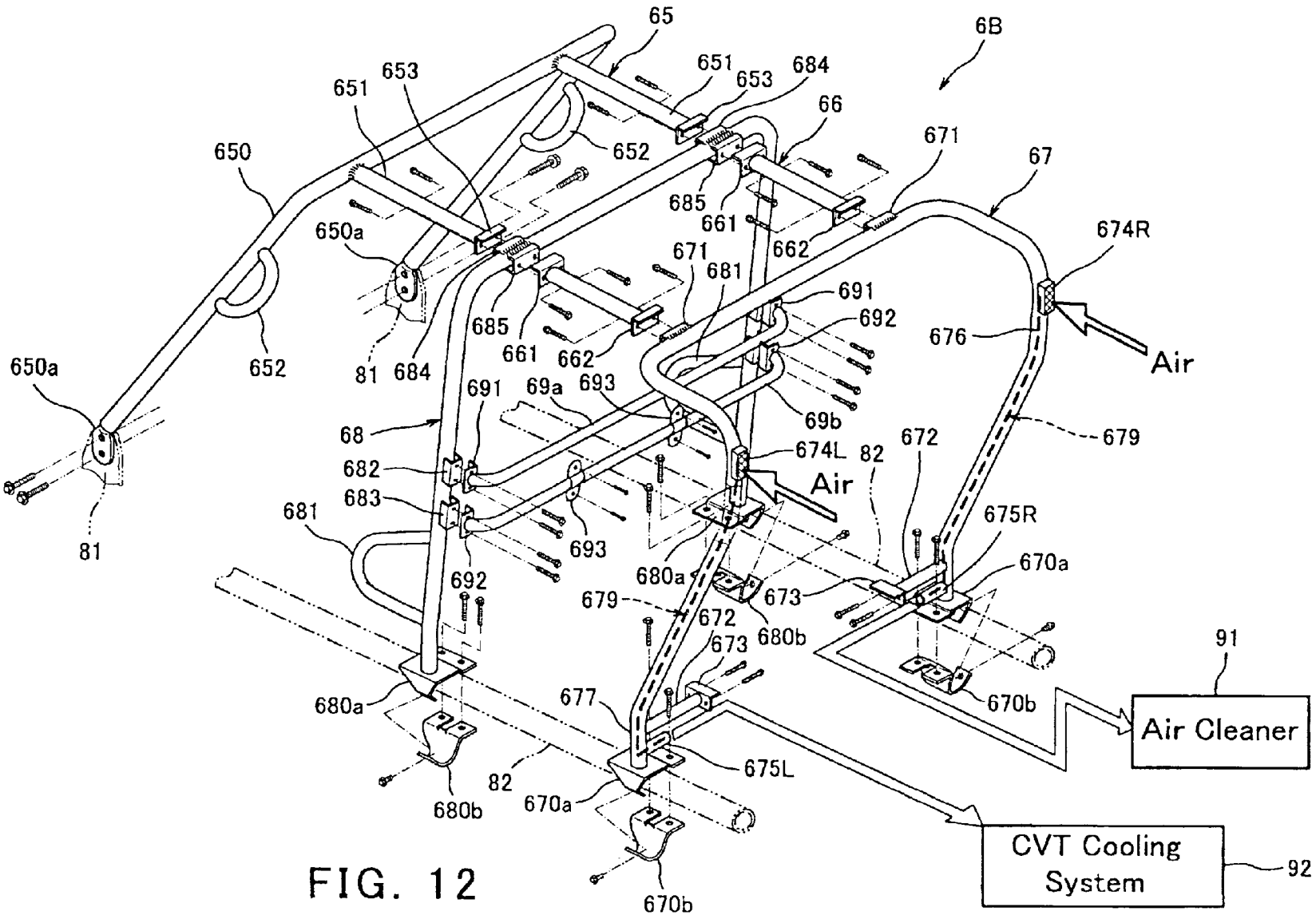
FIG. 12 is an exploded perspective view of the utility vehicle shown in FIG. 8.

As shown better in FIG. 12, the foremost part 65 of the main frame 60 includes a front frame structure 650 formed in an inverse U-shape extending laterally across the vehicle body. The front frame structure 650 is typically made of a metal pipe and each end of the front frame structure 650 includes a bracket 650a. As mentioned above, the front frame structure 650 is detachably coupled to the frame portions 81 of the vehicle body on the sides of the hood 8 in front of the front seat 3B, by fastening members such as bolts which penetrate holes formed in the brackets 650a. Further, handrails 652, each of which is typically formed in a C-shape, typically made of metal pipes, are formed in pillar portions of the front frame structure 650 for driver and passenger seating in the front seat 3B.

The foremost part 65 further includes a pair of front roof structures 651 extending rearward from a top portion of the front frame structure 650. The front roof structures 651 are typically made of metal pipes and both extend horizontally and parallel with each other. The distance between the front roof structures 651 is made narrower than the overall width of the front frame structure 650 in this embodiment. Front ends of the front roof structures 651 are welded to the front frame structure 650 to form an integral unit. Rear ends of the front roof structures 651 are provided with L-shaped brackets 653 to be connected with the intermediate frame 68.

The intermediate frame 68 is also made of a metal pipe and formed in an inverse U-shape extending laterally across the vehicle body. Each end of the intermediate frame 68 includes dividable brackets 680a and 680b. The upper brackets 680a are fixed to the lower ends of the intermediate frame 68. The lower bracket 680b is configured to be separated from the upper bracket 680a and be in a shape so as to cover a lower surface of the respective upper bracket 680a. As mentioned above, the intermediate frame 680 is detachably attached to the opposite side frames 82, by coupling the dividable brackets 680a and 680b together and fastening the brackets by fastening members such as bolts which penetrate holes formed in the brackets 680a and 680b. Further, side guides or arm bars 681 typically made of metal pipes are formed in pillar portions of the intermediate frame 68 corresponding to a height of the front seat 3B. The arm bar 681 is typically in a C-shape, welded to the intermediate frame 68 at ends, and the closed or looped end of the arm bar 681 is facing forward.

The intermediate frame 68 typically includes two cross members 69a and 69b extending laterally between the pillar portions of the intermediate frame 68. In this embodiment, the cross members 69a and 69b are located above the arm bars 681. The cross members 69a and 69b are typically configured to be in widened U-shapes in the lateral direction and, typically spaced apart from each other in the vertical direction to give the intermediate frame 68 more strength. Ends of the cross members 69a and 69b are provided with brackets 691 and 692, respectively, which are formed in the same shape as the brackets 653 of the front roof structures 651. The cross members 69a and 69b are detachably coupled to the intermediate frame 68, by coupling the respective brackets 691 and 692 onto brackets 682 and 683 which are formed in corresponding locations on the intermediate frame 68 and fastening with fastening members such as bolts which penetrate holes formed in the brackets 691 and 692, and 682 and 683.

The lower cross member 69b is located behind a backrest portion 31 of the front seat 3B (see FIGS. 8 though 10) and, typically, coupled to the backrest portion 31 by brackets 693 and screws, to sustain the backrest portion 31 in place. The upper cross member 69a located above the lower cross member 69b is typically located higher than the top of the backrest portion 31 of the front seat 3B and serves as a handrail or supporting grip for passenger(s) seated in the rear seat 4 behind the cross member 69a.

Typically, channel-shaped brackets 684 are formed in corresponding locations on the top portion of the intermediate frame 68, protruding forward. The brackets 653 of the front roof structures 651 are coupled to the respective brackets 684 by fastening members such as bolts. Another pair of channel-shaped brackets 685 are formed in corresponding locations on the top portion of the intermediate frame 68, protruding rearward.

The rearmost part of the main frame 60 is typically constructed from two parts, a pair of rear roof structures 66 and a rear frame structure 67. The rear roof structures 66 are typically both made of metal pipes and extend in the longitudinal direction parallel with each other. The locations of the rear roof structures 66 correspond to locations of the brackets 685 of the intermediate frame 68 to which the rear roof structures 66 are detachably coupled. A front end of each of the rear roof structures 66 is provided with an L-shaped bracket 661 to be connected with the bracket 685 of the intermediate frame 68. Similarly, each rear end of the rear roof structures 66 is provided with an L-shaped bracket 662 to be connected with a bracket 671 formed in a corresponding location on the rear frame structure 67. The brackets provided in the rearmost part of the main frame 60 are formed in similar shapes to those provided in the foremost part 65 and the intermediate frame 68.

The rear frame structure 67 is typically formed in, generally, an inverse U-shape extending laterally across the vehicle body. The rear frame structure 67 is made of a metal pipe and each end of the rear frame structure 67 includes dividable brackets 670a and 670b which are configured to be in the same shape as the dividable brackets 680a and 680b provided in the intermediate frame 68. As mentioned above, the rear frame structure 67 is detachably attached to the opposite side frames 82, by coupling the dividable brackets 670a and 670b together and fastening the brackets by fastening members such as bolts which penetrate holes formed in the brackets 670a and 670b.

Further, the rear frame structure 67 is typically provided with a pair of lateral frames 672. Each of the lateral frames 672 is typically made of a straight metal pipe. One end of the lateral frame 672 is welded to a lower position corresponding to a portion of the vehicle body below the rear seat 4. Other end of the lateral frame 672 protrudes laterally inside the vehicle such that the pair of the lateral frames 672 are opposed to each other. The other end of the lateral frame 672 is provided with a bracket 673 to be connected with a bracket (not shown) of the vehicle body. The brackets 673 provided in the lateral frames 672 are in similar shapes to those provided in the foremost part 65 of the main frame and the intermediate frame 68. As the rear frame structure 67 is connected to the vehicle body by the lateral frames 672, the lateral frames 68 can add the rear frame structure 67 more strength, especially in the lateral direction.

As shown better in FIG. 8, the rear frame structure 67 is coupled to the vehicle body below a front end portion of the bottom portion 42 of the rear seat 4, with the dividable brackets 670a and 670b. Above that, the rear frame structure 67 becomes vertical to form lower pillar portions 677 on both sides and, then, bent or inclined rearward to a predetermined angle above where the lateral frames 672 are located (see FIG. 12). The diagonal portions of the rear frame structure 67 pass through adjacent the bottom portion 42 of the rear seat 4 at substantially the middle of the rear seat in the depth direction and, then, again, become vertical behind the backrest portion 41 of the rear seat 4 to form upper pillar portions 676. The top portion of the rear frame structure 67 is bent approximately 90 degrees to stretch forward. The brackets 671 are provided on a front face of the forward-stretching top portion of the rear frame structure 67.

Figure 8:
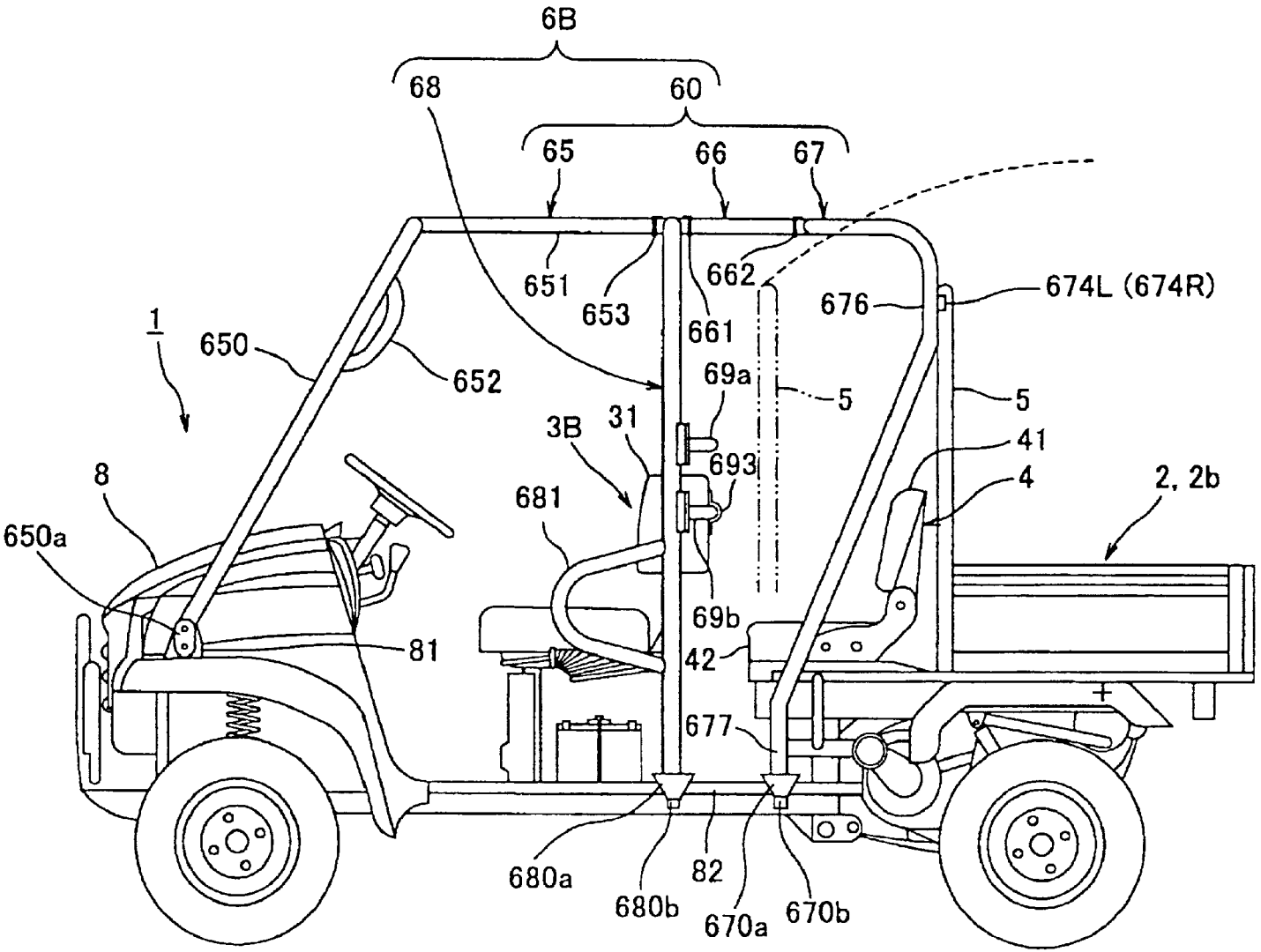
FIG. 8 is a left side view of a utility vehicle with a cabin frame according to another embodiment of the present invention.
Figure 9:
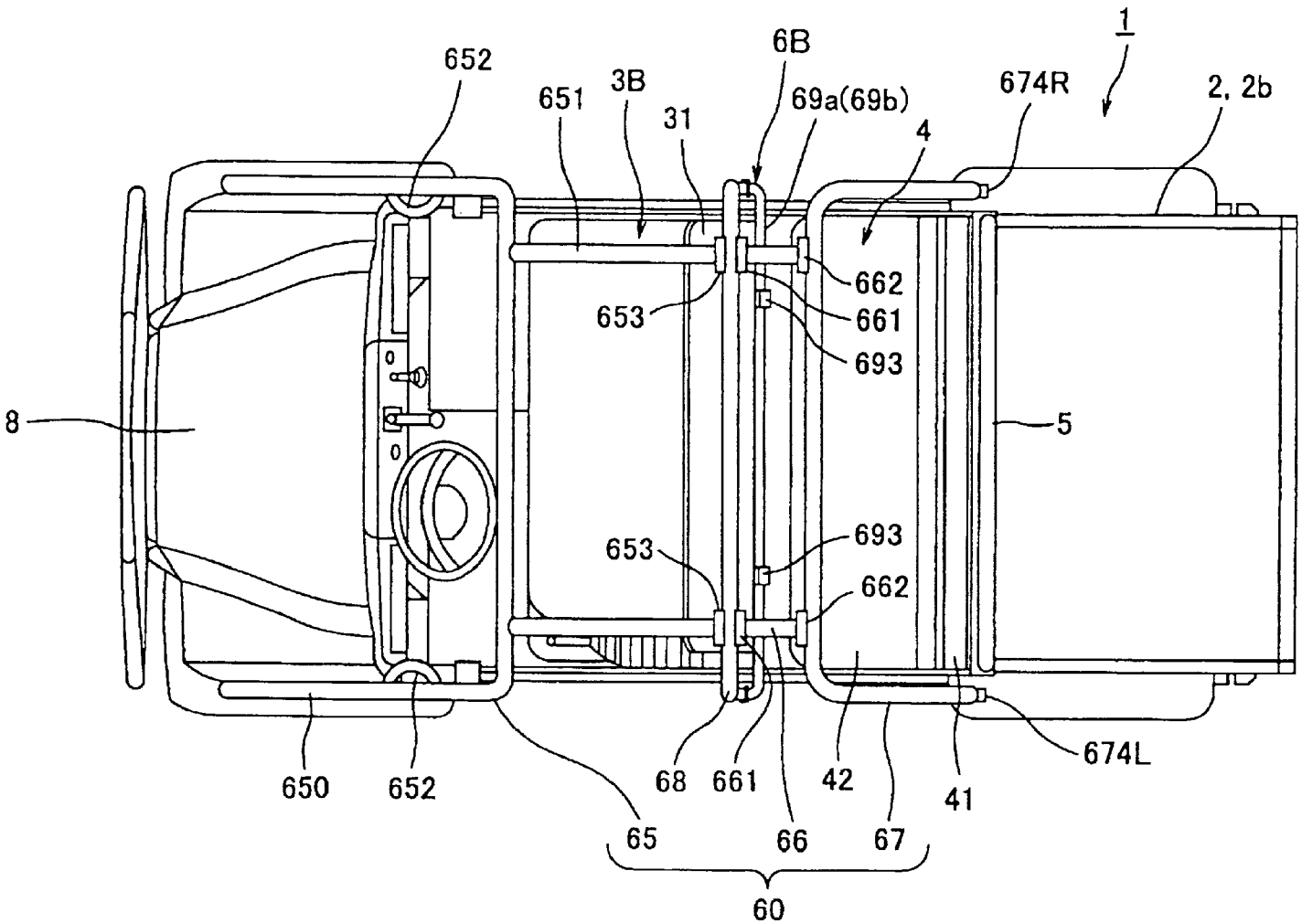
FIG. 9 is a top view of the utility vehicle shown in FIG. 8.
Figure 10:
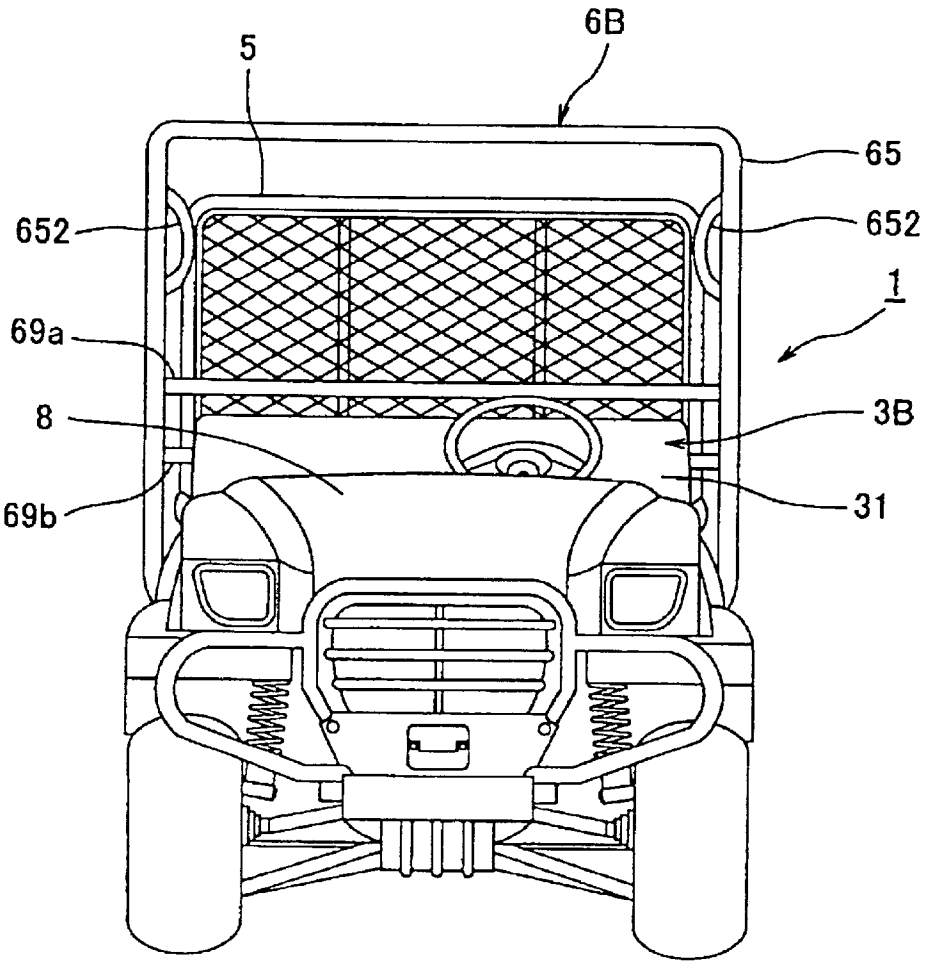
FIG. 10 is a front view of the utility vehicle shown in FIG. 8.
Figure 11:
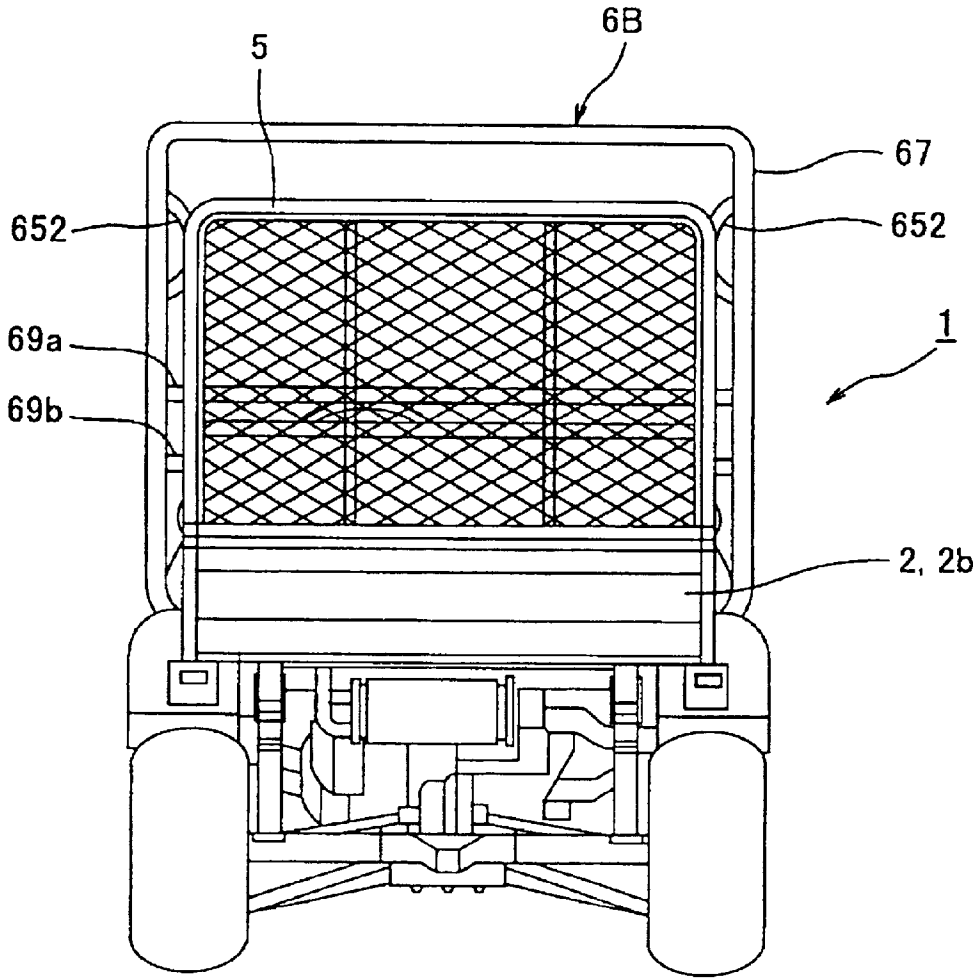
FIG. 11 is a rear view of the utility vehicle shown in FIG. 8.

Since the transverse top portion of the rear frame structure 67 is forwardly extended, a top end of the screen shield 5 does not interfere with the rear frame structure 67 when the cargo bed 2 (2b) is tilted, even when the screen shield 5 is moved into a forward position as the cargo bed is extended forward or moved forward while the rear seat 4 is stowed as described in the above embodiments, as shown with a dashed line in FIG. 8. Rather, the rear frame structure 67 is provided with a screen shield accommodating void formed therein.

As shown in FIG. 12, the right and left upper vertically-extending portions or upper pillar portions 676 of the rear frame structure 67 are provided with air intakes 674R and 674L, respectively, communicating with inside space of the frame pipe. The air intakes 674R and 674L are typically located high in the rear fame structure 67, adjacent a top of the rear frame structure, and do not open upwardly, to avoid contamination by rain or dust, etc., entering into the frame pipe. FIG. 12 shows that both air intakes 674R and 674L are meshed to further inhibit large-size contaminants from entering. The right and left lower vertically-extending portions of the rear frame structure 67 or lower pillar portions 677 are provided with air outlets 675R and 675L, respectively, communicating with the respective air intakes through respective air passages 679 formed inside the rear frame structure 67. The air outlets 675R and 675L are typically located low on the frame structure, adjacent a bottom of the frame structure, to form an inside passage that is as long as possible in order to use the inside passages as air reservoirs. In this embodiment, the air outlets 675R and 675L are located between the dividable brackets 670a, 670b and the lateral frames 672 so that the air outlets 675R and 675L are well hidden in a space formed under the rear seat 4 (see FIG. 8). In this embodiment, the air outlets 675R and 675L are extended inwardly to face opposite each other. The right-side air outlet 675R is connected to an air cleaner 91 of the vehicle and, the left-side air outlet 675L is connected to a continuously variable transmission (CVT) cooling system 92 of the vehicle. Thus, both air cleaner 91 and CVT cooling system 92 are supplied with non-contaminated air through the respective air passages 679 formed inside the rear frame structure 67. In this embodiment, the air passages 679 are connected to air cleaner 91 and CVT cooling system 92, however, it will be appreciated that air passages 679 may be connected to virtually any component on board to supply non-contaminated air.

As described above, in this embodiment, the vehicle includes the cabin frame assembly 6B coupled to the vehicle body so as to cover the rows of seats to define a cabin space of the vehicle. The cabin frame assembly 6B includes the intermediate frame 68 placed between the rows of seats coupled to the vehicle body. The intermediate frame 68 is also coupled to the main frame 60 of the cabin frame assembly 6B to strengthen the main frame 60 which extends arcuately over the rows of seats in the longitudinal direction. The cabin frame assembly 6B may be configured to detach from the vehicle body as shown in the above embodiment, to make whole vehicle compact for storage, shipping or some other purposes.

The cabin frame assembly 6B may be broken down to many discrete frame structures, as shown in the above embodiment, such as to the main frame 60 and the intermediate frame 68. Further, the main frame 60 may be broken down to the foremost part 65 and the rear most part 66 and 67 at a joint (such as the combination of brackets) formed between the main frame 60 and the intermediate frame 68. As already described in the above embodiment, the cabin frame assembly 6B may be broken down to smaller parts that fit into spaces formed around foot areas in front of the seats 3B and 4, inside the cargo bed 2 (2b), and underneath the vehicle body.

The intermediate frame 68 divides the rows of seats in the longitudinal direction, and also includes one or more cross members to give more strength to the intermediate frame 68 and, therefore, to the whole cabin frame assembly 6B.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

The invention claimed is:

1. A utility vehicle having a plurality of rows of seats and a cabin-frame assembly coupled to a vehicle body so as to cover the rows of seats to define a cabin space of the vehicle, the cabin-frame assembly comprising:

a main frame extending in the longitudinal direction of the vehicle substantially arcuately over the rows of seats and having a foremost part and a rearmost part; and an intermediate frame extending substantially arcuately and laterally across the vehicle body between the seat rows, and having a pair of pillar portions extended upwardly and a cross portion extended laterally, wherein lower ends of the pillar portions are detachably coupled to opposite sides of the vehicle body by fastener means, and the cross portion is coupled to upper ends of the pillar portions, the intermediate frame is coupled to and configured to support the main frame;

wherein the foremost part of the main frame includes a front frame structure extending substantially arcuately and laterally, and a front roof structure extending rearward from a top portion of the front frame structure, wherein the front frame structure includes pillar portions extended upwardly and detachably coupled to opposite sides of a front portion of the vehicle body in front of a foremost seat row by a fastener means, and a cross portion extended laterally and coupled to upper ends of the pillar portions;

wherein the rearmost part of the main frame includes a rear frame structure extending substantially arcuately and laterally, and a rear roof structure extending forward from a top portion of the rear frame structure, the rear frame structure includes pillar portions extended upwardly and detachably coupled to opposite sides of a rear portion of the vehicle body near a rearmost seat row by a fastener means, and a cross portion extended laterally and coupled to upper ends of the pillar portions; and wherein the foremost part and the rearmost part are detachably coupled to each other by fastener means.

2. The utility vehicle of claim 1, wherein the foremost part and the rearmost part are detachably coupled to each other through the intermediate frame by the fastener means.

3. The utility vehicle of claim 2, wherein a rear end of the front roof structure and a front end of the rear roof structure are configured to connect with the intermediate frame by the fastener means.

4. The utility vehicle of claim 1, wherein the front roof structure includes a pair of bar-shaped members arranged in the longitudinal direction of the vehicle, substantially in parallel with each other; and wherein the bar-shaped members are welded to the front frame structure to form an integral unit.

5. The utility vehicle of claim 1, further comprising an air cleaner and a CVT cooling system, and wherein the rear frame structure includes:

an air intake;

an air outlet connected to at least one of the air cleaner and the CVT cooling system of the vehicle; and an air passage formed inside the rear frame structure so as to communicate with the air intake and the air outlet.

6. The utility vehicle of claim 1, wherein the vehicle further includes a cargo bed disposed behind a rearmost seat row, the cargo bed being configured to tilt; and wherein the top portion of the rear frame structure is bent forward to form a portion of the rear roof structure, and the bent portion is configured not to interfere with the cargo bed when the cargo bed tilts.

7. The utility vehicle of claim 1, wherein the rear roof structure includes a pair of bar-shaped members arranged in the longitudinal direction of the vehicle, substantially in parallel with each other; and wherein the bar-shaped members are configured to be detachably coupled to the top portion of the rear frame structure.

8. The utility vehicle of claim 1, wherein respective ends of the rear frame structure are configured to be detachably coupled to opposite sides of the vehicle body adjacent corresponding sides of a rearmost seat row; and wherein respective pillar portions of the rear frame structure pass through the corresponding sides of the rearmost seat row and extend above the rearmost seat row at a slant rearward.

9. The utility vehicle of claim 1, wherein the intermediate frame includes a middle cross member extending laterally between the pillar portions of the intermediate frame; and wherein the middle cross member is detachably coupled to middle positions of the pillar portions of the intermediate frame in the vertical direction of the pillar portions to pass through the cabin space.

10. The utility vehicle of claim 9, wherein the cross member supports a backrest portion of a seat row in front of the cross member.

11. The utility vehicle of claim 9, wherein at least a portion of the cross member is configured to be a supporting grip graspable by a passenger seated in a seat row behind the cross frame.

12. The utility vehicle of claim 8, wherein the intermediate frame includes a pair of side guides being coupled to and extending forward from respective locations on opposite sides of the intermediate frame.

13. A utility vehicle having a plurality of rows of seats and a cabin-frame assembly coupled to the vehicle body so as to cover the rows of seats to define a cabin space of the vehicle, the cabin-frame assembly comprising:

a main frame extending in the longitudinal direction of the vehicle substantially arcuately over the rows of seats, wherein a front end of the main frame is coupled to a front portion of the vehicle body and a rear end of the main frame is coupled to a rear portion of the vehicle body;

an intermediate frame extending substantially arcuately and laterally across the vehicle body between the seat rows, wherein respective ends of the intermediate frame are coupled to opposite sides of the vehicle body, and the intermediate frame is coupled to and configured to support the main frame; and a cargo bed disposed behind a rearmost seat row, the cargo bed being configured to tilt;

wherein the main frame includes a joint formed at an intersection of the main frame and the intermediate frame, the main frame being configured to be divisible at the joint;

wherein a rearmost part of the main frame includes a rear frame structure formed in an inverse U-shape extending laterally across the vehicle body, and a rear roof structure extending forward from a top portion of the rear frame structure, wherein a front end of the rear roof structure is configured to connect with the intermediate frame; and wherein the top portion of the rear frame structure is bent forward to form a portion of the rear roof structure, and the bent portion is configured not to interfere with the cargo bed when the cargo bed tilts.

14. A utility vehicle having a plurality of rows of seats, a cargo bed disposed behind the seats, rear wheels located below the cargo bed, and a cabin-frame assembly coupled to the vehicle body so as to cover the rows of seats to define a cabin space of the vehicle, the cabin-frame assembly comprising:

a main frame extending in the longitudinal direction of the vehicle substantially arcuately over the rows of seats, and having a foremost part and a rearmost part, wherein a front end of the foremost part is coupled to a front portion of the vehicle body and a rear end of the rearmost part is coupled to a rear portion of the vehicle body; and an intermediate frame extending substantially arcuately and laterally across the vehicle body between the seat rows, and having a pair of pillar portions extended upwardly and a cross portion extended laterally, wherein lower ends of the pillar portions are coupled to opposite sides of the vehicle body, the cross portion is coupled to upper ends of the pillar portions, and the intermediate frame is coupled to and configured to support the main frame;

wherein the foremost part of the main frame includes a front frame structure extending substantially arcuately and laterally, and a front roof structure extending rearward from a top portion of the front frame structure, wherein the front frame structure includes pillar portions coupled to opposite sides of the vehicle body in front of a foremost seat row and extended upwardly, and a cross portion extended laterally and coupled to upper ends of the pillar portions;

wherein the rearmost part of the main frame includes a rear frame structure extending substantially arcuately and laterally, and a rear roof structure extending forward from a top portion of the rear frame structure, wherein the rear frame structure includes pillar portions extended upwardly, and a cross portion extended laterally and coupled to upper ends of the pillar portions; and wherein a lower end of the pillar portions of the rear frame structure are coupled to opposite sides of the vehicle body adjacent corresponding sides of a rearmost seat row, the pillar portions of the rear frame structure pass through the corresponding sides of the rearmost seat row and extend above the rearmost seat row at a slant rearward, and thereby a rear end of the pillar portions is located between the rearmost seat row and the cargo bed.

15. The utility vehicle of claim 14, wherein the intermediate frame includes a middle cross member extending laterally between the pillar portions of the intermediate frame, the middle cross member is coupled to middle positions of the pillar portions of the intermediate frame in the vertical direction of the pillar portions to pass through the cabin space.

16. The utility vehicle of claim 15, wherein the cross member is detachably coupled to the pillar portions of the intermediate frame by fastener means.

17. The utility vehicle of claim 16, wherein at least a portion of the cross member is configured to be a supporting grip graspable by a passenger seated in a seat row behind the cross frame.

18. The utility vehicle of claim 14, wherein the cargo bed is configured to tilt; and wherein the top portion of the rear frame structure is bent forward to form a portion of the rear roof structure, and the bent portion is configured not to interfere with the cargo bed when the cargo bed tilts.

*19. A utility vehicle comprising:*

*a vehicle body;*

*a plurality of rows of seats coupled to the vehicle body, including a rear seat and a front seat, at least the rear seat being configured to be retractable from a deployed configuration to a stowed configuration;*

*a cabin-frame assembly coupled to the vehicle body so as to cover the rows of seats to define a cabin space of the vehicle, the cabin-frame assembly including a main frame extending in the longitudinal direction of the vehicle over the rows of seats, the main frame having a rear frame structure that is coupled to the vehicle body adjacent the rear seat, and a front frame structure that is coupled to the vehicle body at a location of the vehicle in front of the front seat, the main frame being comprised of metal pipes; and*

*a cargo bed adjustably provided behind the rear seat such that a part of the cargo bed is configured to be moved into an area formerly occupied by the rear seat after the rear seat is retracted to the stowed configuration.*

*20. The utility vehicle of claim 19, wherein the rear seat is configured to be retracted into a leg space of the rear seat, the leg space being defined as a space in front of the rear seat, to be in the stowed configuration.*

*21. The utility vehicle of claim 20, wherein the rear seat includes a bottom portion upon which one or more passengers may sit.*

*22. The utility vehicle of claim 21, wherein a front end of the bottom portion is hinged to the vehicle body so as to be pivotable around a pivot.*

*23. The utility vehicle of claim 22, wherein the bottom portion is connected to the pivot through an arm extending downwardly from the front end of the bottom portion, so that a bottom surface of the bottom portion is moved to a location forward of the pivot when the rear seat is retracted into the stowed configuration.*

*24. The utility vehicle of claim 19, wherein the part of the cargo bed that is configured to be moved into an area formerly occupied by the rear seat after the rear seat is retracted to the stowed configuration, includes extendable portions of a surrounding panel assembly formed around a perimeter of the cargo bed, the extendable portions being configured to be extended from a retracted configuration to an extended configuration, when the rear seat is in the stowed configuration.*

*25. The utility vehicle of claim 24, wherein the extendable portions are configured to slide from the retracted configuration to the extended configuration.*

*26. The utility vehicle of claim 25, wherein the extendable portions form respective side portions of the cargo bed in the retracted configuration.*

*27. The utility vehicle of claim 24, wherein the extendable portions are attached to respective side panels of the cargo bed by corresponding hinges, and are configured to pivot from the retracted configuration to the extended configuration.*

*28. The utility vehicle of claim 27, wherein the extendable portions form respective parts of a front panel of the cargo bed, in the retracted configuration.*

*29. The utility vehicle of claim 27, wherein the extendable portions form respective parts of the corresponding side panels of the cargo bed, in the extended configuration.*

*30. The utility vehicle of claim 19, wherein the cargo bed is moveable from an overhang configuration to a compact configuration in which less of the cargo bed extends over a rear wheel of the vehicle than in the overhang configuration, when the rear seat is in the stowed configuration.*

*31. The utility vehicle of claim 30, wherein the portion of the cargo bed in the compact configuration occupies the area formerly occupied by the seat in the deployed configuration.*

*32. The utility vehicle of claim 19, wherein each of the front frame structure and rear frame structure are formed in an inverse U-shape extending laterally across the vehicle body.*

*33. The utility vehicle of claim 32, wherein the cabin frame assembly further includes an intermediate frame coupled to and configured to support the main frame, the intermediate frame extending substantially arcuately and laterally across the vehicle body between the seat rows.*

*34. The utility vehicle of claim 33, wherein the intermediate frame has a pair of pillar portions extended upwardly and a cross portion extended laterally, wherein lower ends of the pillar portions are detachably coupled to opposite sides of the vehicle body, and the cross portion is coupled to upper ends of the pillar portions, and wherein the intermediate frame is comprised of metal pipes.*

*35. The utility vehicle of claim 19, wherein the front frame structure is coupled to the vehicle body adjacent a hood of the vehicle.*

*36. A utility vehicle comprising:*

*a vehicle body;*

*a plurality of rows of seats coupled to the vehicle body, including a rear seat and a front seat, at least the rear seat being configured to be retractable from a deployed configuration to a stowed configuration;*

*a cabin-frame assembly coupled to the vehicle body so as to cover the rows of seats to define a cabin space of the vehicle, the cabin-frame assembly including a main frame extending in the longitudinal direction of the vehicle over the rows of seats and defining a passageway through which passengers may enter and exit the seats, the main frame having a rear frame structure that is coupled to the vehicle body adjacent the rear seat, and a front frame structure that is coupled to the vehicle body at a location of the vehicle in front of the front seat, the main frame being comprised of metal pipes, wherein each of the front frame structure and rear frame structure are formed in an inverse U-shape extending laterally across the vehicle body; and*

*a cargo bed adjustably provided behind the rear seat such that a part of the cargo bed is configured to be moved through the rear frame structure into an area formerly occupied by the rear seat after the rear seat is retracted to the stowed configuration.*

*37. The utility vehicle of claim 36, wherein the rear seat is configured to be retracted into a leg space of the rear seat, the leg space being defined as a space in front of the rear seat, to be in the stowed configuration.*

*38. The utility vehicle of claim 37, wherein the rear seat includes a bottom portion upon which one or more passengers may sit.*

*39. The utility vehicle of claim 38, wherein a front end of the bottom portion is hinged to the vehicle body so as to be pivotable around a pivot.*

*40. The utility vehicle of claim 39, wherein the bottom portion is connected to the pivot through an arm extending downwardly from the front end of the bottom portion, so that a bottom surface of the bottom portion is moved to a location forward of the pivot when the rear seat is retracted into the stowed configuration.*

*41. The utility vehicle of claim 36, wherein the part of the cargo bed that is configured to be moved into an area formerly occupied by the rear seat after the rear seat is retracted to the stowed configuration, includes extendable portions of a surrounding panel assembly formed around a perimeter of the cargo bed, the extendable portions being configured to be extended from a retracted configuration to an extended configuration, when the rear seat is in the stowed configuration.*

*42. The utility vehicle of claim 41, wherein the extendable portions are configured to slide from the retracted configuration to the extended configuration.*

*43. The utility vehicle of claim 42, wherein the extendable portions form respective side portions of the cargo bed in the retracted configuration.*

*44. The pick-up style utility vehicle of claim 41, wherein the extendable portions are attached to respective side panels of the cargo bed by hinges, and are configured to pivot from the retracted configuration to the extended configuration.*

*45. The utility vehicle of claim 44, wherein the extendable portions form part of a front panel of the cargo bed in the retracted configuration.*

*46. The utility vehicle of claim 44, wherein the extendable portions form respective parts of the corresponding side panels of the cargo bed, in the extended configuration.*

*47. The utility vehicle of claim 36, wherein the cargo bed is moveable from an overhang configuration to a compact configuration in which less of the cargo bed extends over a rear wheel of the vehicle than in the overhang configuration, when the rear seat is in the stowed configuration.*

*48. The utility vehicle of claim 47, wherein the portion of the cargo bed in the compact configuration occupies the area formerly occupied by the seat in the deployed configuration.*

*49. The utility vehicle of claim 36, wherein the cabin frame assembly further includes an intermediate frame coupled to and configured to support the main frame, the intermediate frame extending substantially arcuately and laterally across the vehicle body between the seat rows.*

*50. The utility vehicle of claim 49, wherein the intermediate frame has a pair of pillar portions extended upwardly and a cross portion extended laterally, wherein lower ends of the pillar portions are detachably coupled to opposite sides of the vehicle body, and the cross portion is coupled to upper ends of the pillar portions, and wherein the intermediate frame is comprised of metal pipes.*

*51. The utility vehicle of claim 36, wherein the front frame structure is coupled to the vehicle body adjacent a hood of the vehicle.*

*52. A utility vehicle comprising:*

*a vehicle body;*

*a plurality of rows of seats coupled to the vehicle body, including a rear seat and a front seat, at least the rear seat being configured to be retractable from a deployed configuration to a stowed configuration, wherein the rear seat is configured to be retracted into a leg space of the rear seat, the leg space being defined as a space in front of the rear seat, to be in the stowed configuration;*

*a cabin-frame assembly coupled to the vehicle body so as to cover the rows of seats to define a cabin space of the vehicle, the cabin-frame assembly including a main frame extending in the longitudinal direction of the vehicle over the rows of seats and defining a passageway through which passengers may enter and exit the seats, the main frame having a rear frame structure that is coupled to the vehicle body adjacent the rear seat, and a front frame structure that is coupled to the vehicle body at a location of the vehicle in front of the front seat, the main frame being comprised of metal pipes, wherein each of the front frame structure and rear frame structure are formed in an inverse U-shape extending laterally across the vehicle body; and*

*a cargo bed adjustably provided behind the rear seat such that a part of the cargo bed is configured to be moved through the rear frame structure into an area formerly occupied by the rear seat after the rear seat is retracted to the stowed configuration, wherein said part of the cargo bed includes extendable portions of a surrounding panel assembly formed around a perimeter of the cargo bed, the extendable portions being configured to be extended from a retracted configuration to an extended configuration, when the rear seat is in the stowed configuration, wherein the extendable portions are pivotably attached to respective side panels of the cargo bed, and are configured to pivot from the retracted configuration to the extended configuration, and wherein the extendable portions form part of a front panel of the cargo bed in the retracted configuration.*

*53. A utility vehicle comprising:*

*a vehicle body;*

*a plurality of rows of seats coupled to the vehicle body, including a rear seat and a front seat;*

*a cabin-frame assembly coupled to the vehicle body so as to cover the rows of seats to define a cabin space of the vehicle, the cabin-frame assembly including a main frame extending in the longitudinal direction of the vehicle over the rows of seats and defining a passageway through which passengers may enter and exit the seats, and having a rear frame structure that is coupled to the vehicle body adjacent the rear seat, wherein the rear frame structure is formed in an inverse U-shape extending laterally across the vehicle body, the main frame being comprised of metal pipes; and*

*a cargo bed adjustably provided behind the rear seat, the cargo bed including a surrounding panel assembly formed around a perimeter of the cargo bed, the panel assembly having extendable portions that are configured to be extended from a retracted configuration that does not extend through the inverse U-shaped rear frame structure, to an extended configuration that does extend through the inverse U-shaped rear frame structure.*

*54. The pick-up style utility vehicle of claim 53, wherein the extendable portions are configured to slide from the retracted configuration to the extended configuration.*

*55. The pick-up style utility vehicle of claim 54, wherein the extendable portions form respective side portions of the cargo bed in the retracted configuration.*

*56. The pick-up style utility vehicle of claim 53, wherein the extendable portions are attached to respective side panels of the cargo bed by hinges, and are configured to pivot from the retracted configuration to the extended configuration.*

*57. The pick-up style utility vehicle of claim 56, wherein the extendable portions form part of a front panel of the cargo bed in the retracted configuration.*

*58. The pick-up style utility vehicle of claim 56, wherein the extendable portions form respective parts of the corresponding side panels of the cargo bed, in the extended configuration.*

* * * * *